Dec. 6, 1966     C. E. GEORGE     3,289,541
PROFILING STYLUS
Filed Aug. 30, 1965     2 Sheets-Sheet 1
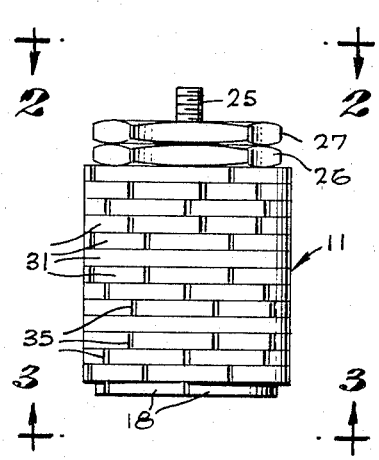
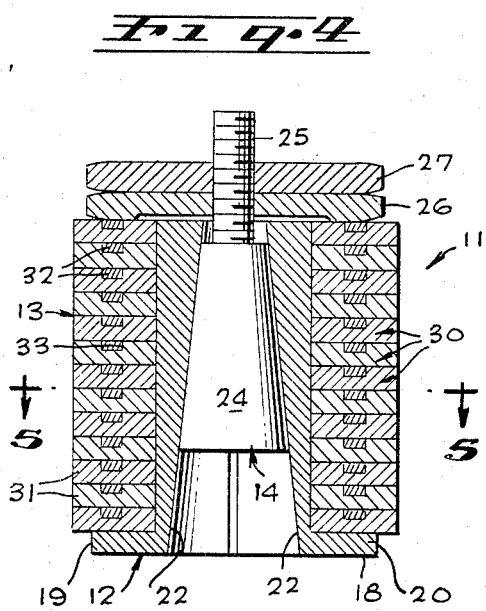
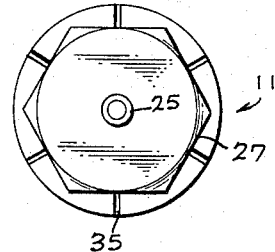
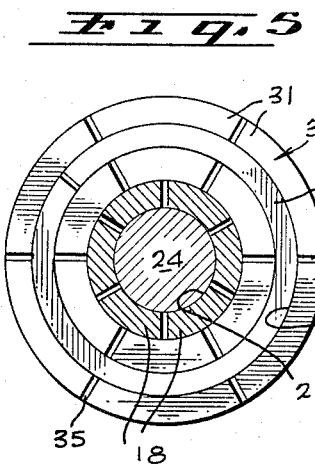
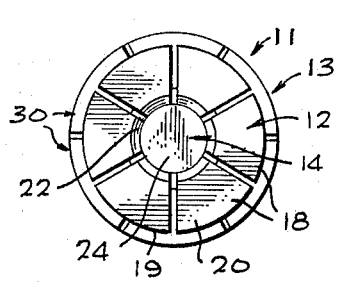
CONNIE EVAN GEORGE
*INVENTOR.*
BY
*Mason & Graham*
ATTORNEYS

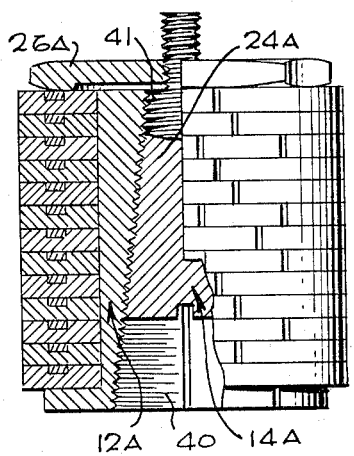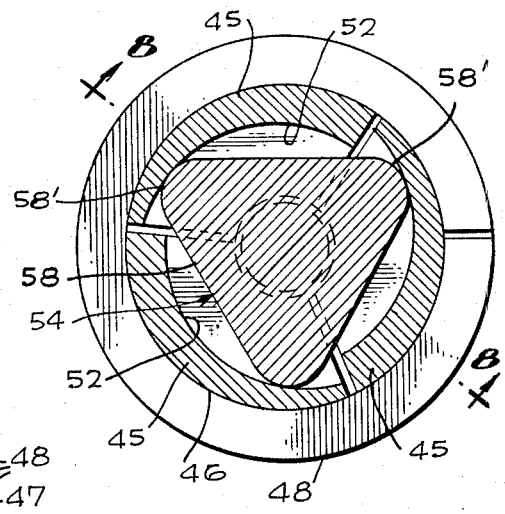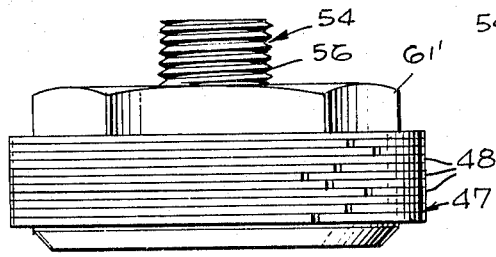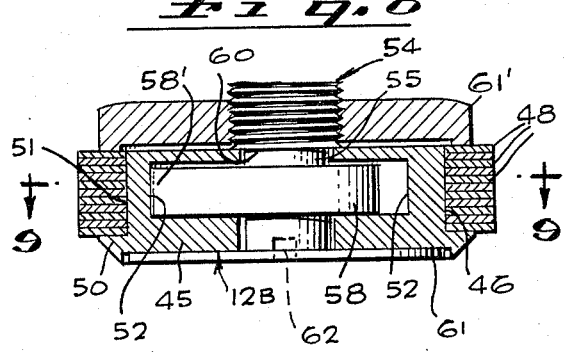

United States Patent Office 3,289,541
Patented Dec. 6, 1966

3,289,541
PROFILING STYLUS
Connie E. George, 5715 Fountain Ave.,
Hollywood, Calif.
Filed Aug. 30, 1965, Ser. No. 483,521
10 Claims. (Cl. 90—62)

This invention relates generally to machine tools used in profiling wherein a machine having a cutting member is mechanically connected to a tracing member which follows a pattern or template, causing the cutting member to duplicate the pattern traced. The tracing member is usually in the form of a stylus and the invention relates particularly to such stylii.

In modern day machining, since the dimensions of most parts must be held to very close tolerances, in profiling it is essential that the tracer stylus correspond exactly in diameter to the cutter. However, the cutters become worn and must be resharpened, thereby decreasing their diameters. Heretofore it has been the practice to make a new stylus of appropriate size so that its diameter will be the same as the resharpened cutter, or to grind the old stylus down to correspond in diameter to the cutter. This is time consuming, and eventually the styus becomes too small for use, and a new one must be provided.

An object of the invention is to provide a new and improved profiling stylus which can be readily adjusted to change its diameter. In this connection it is an object to provide such a stylus in which the range of adjustment is sufficiently large to extend from the size of a new cutter of given dimensions to the next smaller standard size cutter.

Another object is to provide an adjustable diameter stylus so designed that, when mounted, it is exactly centered with reference to the conventional center shaft of the tracer arm thereby enabling its use for 360° tracing.

A further object is to provide an adjustable stylus which, once it has been adjusted, can be locked in adjusted position so that the various parts thereof are virtually one solid piece.

Still another object is to provide a stylus which can incorporate either a vernier or micrometer type scale, or can be made to adjust with a wrench tool.

These and other objects will be apparent from the drawings and the following description. Referring to the drawings:

FIG. 1 is a side elevational view of a stylus embodying the invention;

FIG. 2 is a plan view of the stylus of FIG. 1, on line 2—2 thereof;

FIG. 3 is an inverted plan view of the stylus of FIG. 1, on line 3—3 thereof;

FIG. 4 is a central sectional elevational view of the stylus of FIG. 1, but on a larger scale;

FIG. 5 is a cross sectional view on line 5—5 of FIG. 4;

FIG. 6 is an elevational view, partly in longitudinal section, of a modified form of the invention on the same scale as FIG. 4;

FIG. 7 is a side elevational view of a stylus embodying another form of the invention;

FIG. 8 is a sectional elevational view of the stylus of FIG. 7, the plane of the section being indicated by line 8—8 of FIG. 9; and FIG. 9 is a sectional plan view on line 9—9 of FIG. 8.

More particularly describing the invention, referring first to FIGS. 1–5, numeral 11 generally designates an adjustable profiling stylus. In general this is made up of an inner section 12, an outer section 13, a center member 14 and means for releasably fixedly securing the various parts together after the diameter of the device has been adjusted, as will later appear.

In the form of the invention shown in FIGS. 1–5, the inner section is made up of a plurality of segments designated 18. The inner section as a whole is formed to provide an axially interrupted cylindrical outer surface 19, although the configuration of this surface could be some other geometrical figure which is symmetrical about the axis of the section. Each of the segments is provided with a flange or foot 20 at one end so that together they form a supporting ledge for the parts of the outer section. The inner surfaces 22 of the segments of the inner section are tapered axially so that together they substantially form a frustum of a cone. The center member 14 is comprised of a main body 24 which corresponds in configuration to the space inside the inner section, and thus, in the form shown, it is frusto-conical in shape. This center member is shorter than the inner section and is provided with a threaded stem or shank 25 which extends a substantial distance beyond the end of the inner section. The stem is designed to carry two nuts, designated 26 and 27, respectively.

The outer section 13 is comprised of a plurality of segmented rings 30, each ring being made up of a plurality of segments 31. The latter are held together by means of split rings 32 received in grooves 33 in one end face of the segments of the rings. The rings are supported at one end by the flange 20 of inner section 12 and at the other end by nut 26.

With the construction described, it will be apparent that the over-all diameter of the device can be adjusted by adjusting the axial position of the center member 14 relative to the inner section 12 and, once the adjustment has been made, the parts can be locked in adjusted position by means of the nuts 26 and 27 on the stem. It will also be apparent that the segments 31 of the various rings 30 are so disposed that the spaces 35 between the segments are not in axial alignment, as best seen in FIG. 1, and thus no flat spots are presented by the periphery of the stylus which are not bridged by a circular surface.

In FIG. 6, I show an alternate form of the invention wherein the inner section 12A is interiorly threaded at 40 to receive a center member 14A having a body 24A provided with exterior threads 41. In this form of the invention, the center member is turned relative to the inner section in order to effect an adjustment of the diameter. A lock nut 26A serves to secure the parts, once adjusted.

In FIGS. 7–9, I show an alternate form of the invention wherein the inner section, here designated 12B, is shown as made up of three segments 45 together having a circular periphery 46. Around these I provide an outer section 47 made up of a plurality of split rings 48. In place of the split rings I may use segmented rings 30 of the type shown and described above.

The segments 45 of the inner section 12B are channel-shaped in cross section with an external flange 50 at one end and a peripheral circular surface 51 extending therefrom to the other end. Each segment is formed to provide an inner cam surface 52 which is spirally disposed relative to the axis of the device. I provide a center member 54 having a stem body 55, the upper end of which is threaded at 56. The body 55 is provided with a substantially triangular flange or three-lobed cam 58 which is received in the segments with the lobes 58' bearing against the inner surfaces of the segments 45, respectively. The segments are secured against axial movement by a shoulder 60 on the center member and by an end disk 61 thereon. A tool socket 62 may be provided for turning the center member. By rotating the center member relative to the inner section in an appropriate direction, the inner section and outer section are expanded or enabled to be contracted, as required. The parts can then be locked in adjusted position by means of a nut 61' on the threaded portion 56 of the center member.

Although I have shown and described preferred forms of my invention, I contemplate that various changes and modifications can be made therein without departing from the invention, the scope of which is indicated by the claims. For example, it is not essential that the inner section 12 and center member 14 of the form shown in FIGS. 1–5 be frusto-conical since other symmetrical wedge-shaped forms might be used. Also, the periphery of the outer section 12 need not be round so long as the periphery is symmetrical about the axis of the device and the rings 30 co-fit therewith.

I claim:

1. An adjustable diameter profiling stylus, comprising a tubular inner section made up of a plurality of segments with arcuate outer surfaces together forming an axially interrupted cylindrical surface, a center member within said inner section and adjustably positionable axially with respect thereto, said center member and said inner section having interengaging axially tapered wedging surfaces whereby the relative axial position of said member to said section determines the diameter of said inner section, an outer annular section around said inner section made up of a plurality of superposed corresponding rings each including a plurality of ring segments with arcuate outer surfaces together forming an axially interrupted cylindrical outer surface, said ring segments having arcuate concave inner surfaces with a radius substantially the same as the radius of the arcuate outer surfaces of the inner section, and means on said inner section and said center member releasably fixedly holding said rings in place.

2. The stylus set forth in claim 1 in which the individual ring segments of each ring are held together on said inner section by a split ring received in a groove in the segments.

3. The stylus set forth in claim 1 in which the means on said inner section and said center member releasably fixedly holding said rings in place comprises flange means on one end of said inner section and a threaded stem and nut on the opposite end of said center member.

4. An adjustable diameter profiling stylus comprising a tubular inner section made up of a plurality of segments having outer surfaces defining a geometric figure symmetrical about the axis of the section, a center member within said inner section and adjustably positionable axially thereof, said inner section and said center member having interengaging axially tapered wedging surfaces whereby the relative axial position of said member to said section determines the diameter of said inner section, an outer annular section around said inner section made up of a plurality of axially superposed rings each including a plurality of ring segments with arcuate outer surfaces together forming an axially interrupted cylindrical outer surface, flexible means retaining said ring segments around said inner section, and means carried by said inner section and said center member for releasably fixedly clamping said rings in place.

5. The stylus set forth in claim 4 in which the flexible means retaining said ring segments around said inner section comprises a split spring ring received in an annular groove in the ring segments of each ring.

6. An adjustable diameter profiling stylus comprising a tubular inner section made up of a plurality of segments having outer surfaces defining a geometric figure symmetrical about the axis of the section, a center member within said inner section and adjustably positionable axially thereof, said inner section and said center member having interengaging axially tapered wedging surfaces whereby the relative axial position of said member to said section determines the diameter of said inner section, an outer annular section around said inner section made up of a plurality of axially superposed rings each including a plurality of ring segments with arcuate outer surfaces together forming an axially interrupted cylindrical outer surface, the ring segments of each ring being formed to provide a circular groove in an end face of the ring, a split ring received in each said groove, and means carried by said inner section and said center member for releasably fixedly clamping said rings in place.

7. The stylus set forth in claim 6 in which the means for releasably fixedly clamping said rings in place comprises a flange on one end of said inner section and releasable abutment means on the opposite end of said center member.

8. An adjustable diameter profiling stylus comprising a tubular inner section made up of a plurality of segments having outer surfaces defining a geometric figure symmetrical about the axis of the section, a center member within said inner section and adjustably positionable relative thereto, said inner section and said center member having interengaging wedging surfaces whereby relative movement of said member and section in one direction increases the diameter of said inner section, an outer annular section on said inner section made up of a plurality of axially superposed split rings, and means carried by said inner section and center member for releasably fixedly clamping said rings in place.

9. The stylus set forth in claim 8 in which said interengaging wedging surfaces comprise cam surfaces each of semi-spiral shape on one of said inner section and center member and a cam follower for each of said cam surfaces on the other, and in which said inner section and said center member are relatively rotatable.

10. An adjustable diameter profiling stylus comprising a tubular inner section made up of a plurality of segments having outer surfaces defining a geometric figure symmetrical about the axis of the section, said segments having corresponding inner cam surfaces each formed as a section of a spiral, a center member within said inner section and adjustably positionable rotatably thereof, said inner section having cam lobes engageable with the cam surfaces of the inner section, whereby the relative rotative position of said member and section determines the diameter of said inner section, an outer annular section on said inner section made up of a plurality of axially superposed corresponding split rings, and means carried by said inner section and center member for releasably fixedly clamping said rings in place.

No references cited.

WILLIAM W. DYER, Jr., *Primary Examiner.*

GERALD A. DOST, *Assistant Examiner.*